United States Patent
Smith et al.

(10) Patent No.: US 12,256,355 B2
(45) Date of Patent: Mar. 18, 2025

(54) MOBILE TIME-SYNC DISTRIBUTION

(71) Applicant: Cisco Technology, Inc., San Jose, CA (US)

(72) Inventors: Malcolm Muir Smith, Richardson, TX (US); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/200,231

(22) Filed: May 22, 2023

(65) Prior Publication Data

US 2023/0300771 A1   Sep. 21, 2023

Related U.S. Application Data

(63) Continuation of application No. 17/555,595, filed on Dec. 20, 2021, now Pat. No. 11,700,590.

(51) Int. Cl.
*H04W 56/00* (2009.01)
*H04L 43/0864* (2022.01)

(52) U.S. Cl.
CPC ....... *H04W 56/009* (2013.01); *H04L 43/0864* (2013.01); *H04W 56/005* (2013.01)

(58) Field of Classification Search
None
See application file for complete search history.

(56) References Cited

U.S. PATENT DOCUMENTS

| 7,920,881 B2 * | 4/2011 | Fullam | H04N 21/242 |
| | | | 709/248 |
| 10,349,367 B2 * | 7/2019 | Aldana | H04W 24/10 |

(Continued)

FOREIGN PATENT DOCUMENTS

| WO | WO2017026976 A1 | 2/2017 |
| WO | WO2022208449 | 10/2022 |

(Continued)

OTHER PUBLICATIONS

Office Action for U.S. Appl. No. 17/555,595, mailed on Nov. 10, 2022, Smith, "Mobile Time-Sync Distribution", 15 Pages.

(Continued)

*Primary Examiner* — Nathan S Taylor
(74) *Attorney, Agent, or Firm* — Lee & Hayes, P.C.

(57) ABSTRACT

This technology allows time synchronization in wireless networks with mobile stations. A wireless network controller transmits instructions to access points ("APs") within the wireless network to monitor transmissions for time synchronization. One or more second APs observe fine time measurement ("FTM") exchanges between a first AP and a mobile station. A particular second AP determines whether to perform a time synchronization with the first AP based on the detection of the FTM exchange or a determination that the station is moving toward the second AP. For time synchronization, the second AP determines the time that the first AP transmitted the FTM exchange and the time of transmission from the first AP to the second AP. The second AP synchronizes a second AP clock to the summation of the time of the transmission of the FTM exchange and the time of transmission from the first AP to the second AP.

17 Claims, 9 Drawing Sheets

(56) References Cited

U.S. PATENT DOCUMENTS

| | | | | |
|---|---|---|---|---|
| 2008/0287153 | A1* | 11/2008 | Fullam | H04N 21/4302 |
| | | | | 455/502 |
| 2011/0281571 | A1* | 11/2011 | Patel | H04W 56/0015 |
| | | | | 455/418 |
| 2014/0064303 | A1* | 3/2014 | Aweya | H04J 3/0667 |
| | | | | 370/509 |
| 2015/0092754 | A1* | 4/2015 | Gupta | H04W 56/0035 |
| | | | | 370/336 |
| 2016/0165558 | A1* | 6/2016 | Kafle | H04L 65/80 |
| | | | | 370/350 |
| 2017/0188191 | A1* | 6/2017 | Aldana | H04W 4/023 |
| 2017/0223651 | A1* | 8/2017 | Patel | H04W 24/08 |
| 2018/0310133 | A1* | 10/2018 | Ramasamy | G01S 19/48 |
| 2019/0082345 | A1* | 3/2019 | Venkatesan | H04W 24/10 |
| 2019/0190635 | A1* | 6/2019 | Goel | H04J 3/0667 |
| 2019/0239172 | A1* | 8/2019 | Hampel | H04W 56/0065 |
| 2019/0254057 | A1* | 8/2019 | Hampel | H04W 28/02 |
| 2019/0285749 | A1* | 9/2019 | Chen | G01S 7/487 |
| 2020/0127751 | A1* | 4/2020 | Itagaki | H04J 3/0667 |
| 2020/0145940 | A1* | 5/2020 | Gage | H04W 36/04 |
| 2020/0412813 | A1* | 12/2020 | Mong | B61L 27/04 |
| 2021/0157355 | A1* | 5/2021 | Sarda | G06F 1/12 |
| 2021/0360548 | A1* | 11/2021 | Chandramouli | H04W 56/001 |
| 2021/0400610 | A1* | 12/2021 | Aijaz | H04L 7/0012 |
| 2022/0123849 | A1* | 4/2022 | McCall | H04J 3/0658 |
| 2022/0322120 | A1* | 10/2022 | Deshmukh | H04W 56/0035 |
| 2022/0417883 | A1* | 12/2022 | Fu | H04W 56/0015 |
| 2023/0164662 | A1* | 5/2023 | Agarwal | H04W 56/0015 |
| | | | | 370/392 |
| 2023/0309037 | A1* | 9/2023 | Zou | H04W 56/0015 |

FOREIGN PATENT DOCUMENTS

| | | | |
|---|---|---|---|
| WO | WO-2022208449 | A1 * | 10/2022 |
| WO | WO-2023033835 | A1 * | 3/2023 |

OTHER PUBLICATIONS

The PCT Search Report and Written Opinion mailed Apr. 5, 2023 for PCT application No. PCT/US2022/053365, 14 pages.

* cited by examiner

MOBILE TIME-SYNC DISTRIBUTION

RELATED APPLICATIONS

This application claims priority to and is a continuation of U.S. patent application Ser. No. 17/555,595, filed on Dec. 20, 2021, the entire contents of which are incorporated herein by reference.

TECHNICAL FIELD

This disclosure relates to time synchronization in wireless networks with mobile stations.

BACKGROUND

Next Generation Network wireless network configurations rely on accurate time synchronization for time sensitive applications, such as multi-user applications and Internet of Things devices. Time synchronization capability is provided by IEEE standard 802.1AS by either time measurement or fine time measurement exchanges. IEEE standard 802.1AS is defined for point to point synchronization within the network where access points function as generic Precision Time Protocol reference clocks (also known as master clocks).

The IEEE 802.1AS standard provides time synchronization between access points and application servers. Client devices, or stations, are time synchronized with the access point with which the client devices are in communication. The client devices are not necessarily time synchronized to the same absolute time as the access point and the application server, but client devices in close proximity to each other have the same reference time.

In this context, two neighboring access points with non-overlapping sets of client devices may express different absolute times. The different absolute times of the access points does not present an issue for client devices associated with an application that is limited to a particular access point or in configurations in which the access points do not include overlapping physical spaces. However, if a client device is mobile and transitions from a first access point to a second access point while still associated with the same application or interacting with other client devices connected to the first access point, glitches or skip-ahead events may occur.

A large quantity of mobile client devices may need to maintain timing accuracy while moving between access points. In conventional solutions, each client device needs to re-synchronize with each access point, resulting in large time measurement or fine time measurement transaction overhead and synchronization delay.

DETAILED DESCRIPTION

Overview

The present technology enables time synchronization in wireless local area networks with mobile stations. The IEEE 802.1AS standard provides time synchronization between access points and application servers. Stations, or client devices, are time synchronized with the access point with which the stations are in communication. The stations are not necessarily time synchronized to the same absolute time as the access point and application server, but stations in close proximity to each other have the same reference time. When stations are mobile and transition between access points in wireless local area networks, the stations need to maintain communications with the same reference time to other stations as the stations transition to different access points to avoid glitches or skip-ahead events.

In a first example embodiment, a wireless local area network controller transmits instructions to access points within a wireless local area network to monitor transmissions for time synchronization. The instructions from the wireless local area network controller direct each of the access points to monitor transmissions from other access points for fine time measurement exchanges between the access points and stations or client devices. The access points monitor the transmissions by changing channels to match the transmission channel of each of the other access points. While the following examples describe a single access point in communication with a single station, multiple access points may perform fine time measurement exchanges with multiple stations simultaneously. In an example, a first access point performs fine time measurement exchanges with a station.

One or more second access points observe the fine time measurement exchanges between the first access point and the station. For example, a particular second access point determines whether to perform a time synchronization with the first access point. In one embodiment, the second access point may be configured to time synchronize with the first access point upon detecting the fine time measurement exchange between the first access point and the station. The second access point determines the time of the transmission of the fine time measurement from the first access point. The second access point then determines the transmission time between the first access point and the second access point using a location mapping. The second access point synchronizes the second access point's clock to the summation of the transmission time and the time of the transmission. In an alternate example, the second access point synchronizes a virtual clock associated with the particular station to the summation of the transmission time and the time of the transmission.

The second access point may be configured to determine whether the station is moving toward the second access point prior to time synchronization with the first access point. To determine if the station is moving toward the second access point, the second access point determines the round trip transmission time between the second access point and the station based on times observed during the fine time measurement exchange between the first access point and the station and the intermediate observation times at the second access point. To determine the round trip transmission time, the second access point may calculate a processing delay in the station based on factors such as bandwidth and short interframe spacing. To determine whether the station is moving toward the second access point, a value of the round trip transmission time is compared to a subsequent round trip transmission time value. If the subsequent round trip transmission time is greater than the previous round trip transmission time value, the station is determined to be moving away from the second access point. If the subsequent round trip transmission time is less than the previous round trip transmission time value, the station is determined to be moving toward the second access point. If the subsequent round trip transmission time is equal to the previous round trip transmission time value, the station is determined to be stationary with respect to the second access point.

If the station is not moving toward the second access point, the second access point continues to monitor fine time measurement exchanges between the first access point and the station to collect data for additional round trip transmission time calculations. If the station is moving toward the second access point, the second access point performs a time synchronization with the first access point, as previously described herein.

In a second embodiment, time synchronization between access points can be initiated by the mobile stations. An advantage of the second embodiment is that time synchronization may be achieved without the need for the access points to change channels to monitor fine time measurement exchanges. Fine time measurement exchanges occur between access points and stations, as previously described. A station determines a need to transition from a first access point to a second access point based on the location of the station relative to the access points. In an example, each station comprises a location mapping of the access points within the wireless local area network and each station can determine when a transition to a new access point will be necessary to maintain wireless communications within the wireless local area network.

Upon determining a need to transition to a new access point, the station determines the transmission time from the first access point to the station based on a timestamp in the fine time measurement exchange from the first access point and the time of receipt of the fine time measurement message at the station. The station determines a current time at the first access point using the timestamp in the fine time measurement exchange and the transmission time. The current time at the first access point is the summation of the timestamp value and the transmission time.

The station then performs a fine time measurement exchange with the second access point for time synchronization with the first access point. The station transmits a frame to the second access point with a time value at the first access point for time synchronization to the first access point. The time value accounts for the processing delay within the station. The second access point then time synchronizes with the first access point with the time received from the station, as previously described herein.

In a third embodiment, the wireless local area network controller initiates time synchronization between access points based on mobile station reporting. The wireless local area network controller observes communications between a station and a first access point. The wireless local area network controller receives a report of the station transmitting a probe request that is received by a second access point. The wireless local area network controller transmits instructions to the second access point to time synchronize with the first access point by changing channels to match the transmission channel of the first access point. The wireless local area network controller then transmits instructions to the second access point to perform a fine time measurement exchange with the first access point. The second access point retrieves the first access point's time from an acknowledgement frame received from the first access point. The second access point determines the transmission time from the first access point to the second access point based on the location mapping. The second access point then synchronizes the second access point clock to summation of the first access point time and the transmission time from the first access point to the second access point.

The present technology allows time synchronization in wireless networks with mobile stations. When stations are mobile and transition from a first access point to a second access point while still being associated with the same application or interacting with other stations connected to the first access point, glitches or skip-ahead events may occur. In addition, a large quantity of mobile stations may need to maintain timing accuracy while moving between access points. In conventional solutions, each client device needs to re-synchronize with each access point, resulting in large time measurement or fine time measurement transaction overhead and synchronization delay. The present technology provides synchronization of access points in wireless networks while reducing transaction overhead and synchronization delay.

These and other aspects, objects, features, and advantages of the disclosed technology will become apparent to those having ordinary skill in the art upon consideration of the following detailed description of illustrated examples.

Example System Architecture

Turning now to the drawings, in which like numerals indicate like (but not necessarily identical) elements throughout the figures, examples of the technology are described in detail.

Figure 1:
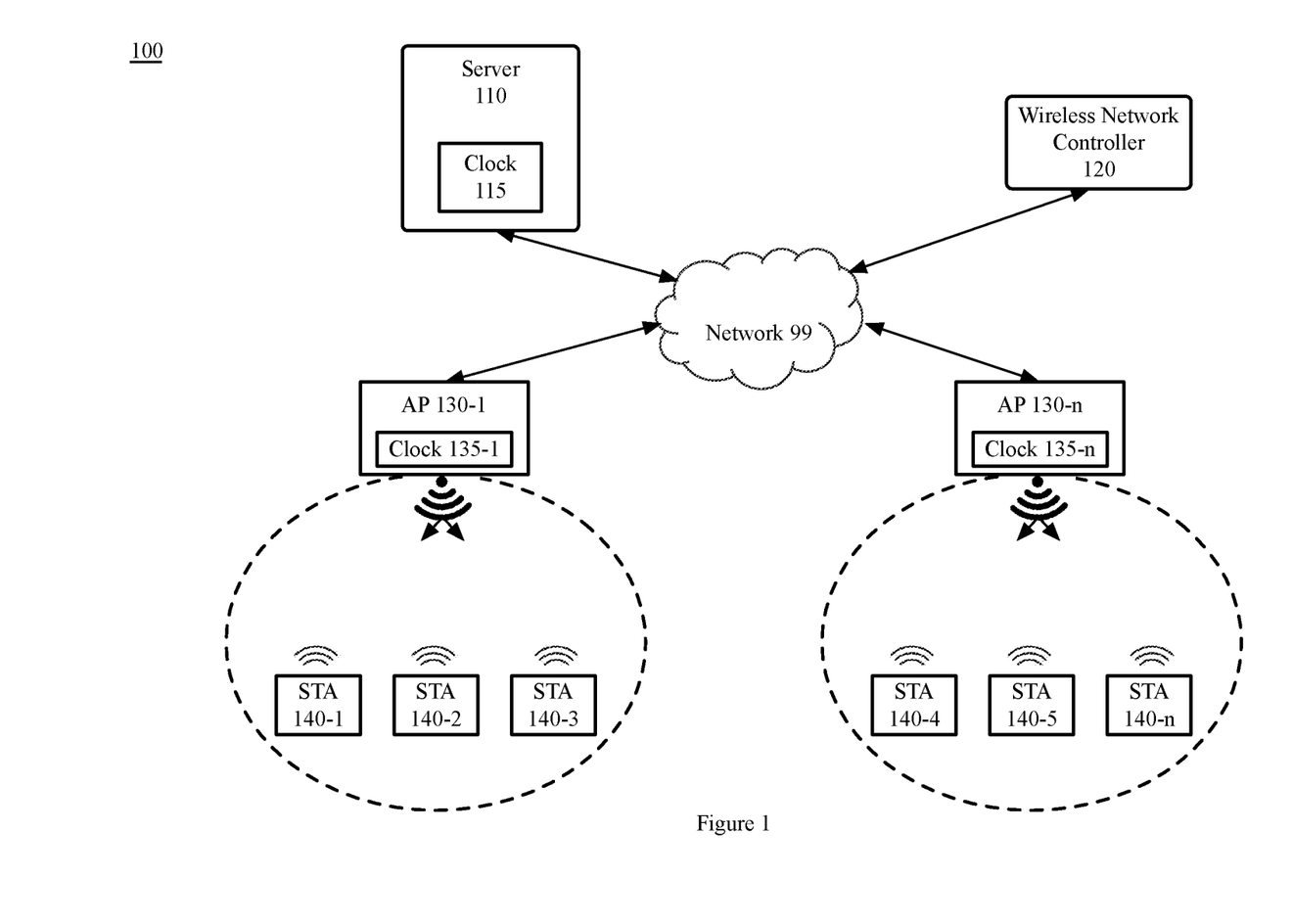
FIG. 1 is a block diagram depicting a wireless local area network system, in accordance with certain examples.

FIG. 1 is a block diagram depicting a wireless local area network system 100, in accordance with certain examples. As depicted in FIG. 1, the wireless local area network system 100 comprises a network 99, a server 110, a wireless network controller ("WLC") 120, two or more access points ("AP") 130-1 through 130-*n*, and one or more stations ("STA") 140-1 through 140-*n*.

In example embodiments, network 99 includes one or more wired or wireless telecommunications systems by which network devices may exchange data. For example, the network 99 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Wireless local area network system 100 comprises server 110. In an example, server 110 is an application server in communication with APs 130 via network 99. While FIG. 1 illustrates a single server 110, wireless local area network system 100 may comprise multiple servers 110. Each AP 130 may be in communication with one or more servers 110 via network 99. In an example, server 110 executes applications to provide location-based services, such as, but not limited to, navigation software, social networking services, location-based advertising, tracking systems, and location-based gaming. Server 110 comprises one or more computing devices and a clock 115.

Clock 115 may be a component of server 110, as depicted in FIG. 1, or clock 115 may be external to server 110 with communications to server 110 via a wired or wireless network, such as network 99. In an example, clock 115 functions as a reference clock (or master clock) for time synchronization with APs 130 in accordance with IEEE 802.1AS standards.

Wireless local area network system 100 comprises a wireless network controller ("WLC") 120. WLC 120 is a computing device that functions to manage the devices within wireless local area network system 100. For example, WLC 120 manages APs 130 to allow wireless devices, such as STAs 140, to connect to the network 99.

Wireless local area network system 100 comprises two or more APs 130. APs 130 function to transmit and receive wireless (i.e., Wi-Fi) signals to and from devices within wireless local area network system 100, such as STAs 140. While APs 130-1 through 130-$n$ are depicted as similar devices in FIG. 1, each AP 130 may be one of numerous different types of network hardware devices. Each AP 130 comprises one or more auxiliary radios and/or service channels for transmitting and receiving wireless signals. Each radio may have an internal antenna or both an internal and external antenna. The 802.11 standard designates the radio frequencies used by each AP 130. Each AP 130 may connect to a router (not depicted in FIG. 1) or may be a component of the router itself.

Each AP 130 comprises a clock 135. Clocks 135 are synchronized with clock 115 in accordance with IEEE 802.1AS standards. Each AP 130 may comprise one or more virtual clocks. In an example, each AP 130 may comprise a virtual clock designated for each of the STAs 140 in communication with the AP 130. For example, as depicted in FIG. 1, AP 130-1 is in communication with STAs 140-1 through 140-3. AP 130-1 may comprise a virtual clock associated with each of STAs 140-1 through 140-3.

Each AP 130 may be programmed to comprise a location mapping of each of the APs 130 within wireless local area network system 100. The location mapping of each of the APs 130 allows each AP 130 to calculate a transmission time to another AP 130. For example, AP 130-1 can calculate the transmission time to AP 130-2, AP 130-3, or AP 130-4.

Wireless local area network system 100 comprises one or more STAs 140. STAs 140 are computing devices capable of receiving and transmitting wireless signals. STA 140 may also be referred to as a wireless client or a node. In an example, STAs 140 are devices with the capability to use the IEEE 802.11 protocol for wireless network communications. Each STA 140 can be a laptop, a desktop, a personal digital assistant ("PDA"), a Wi-Fi phone, an automated guided vehicle ("AGV"), an autonomous mobile robot ("AMR"), augmented reality ("AR") or virtual reality ("VR") headsets, Internet of things ("IoT") devices, or any other devices with wireless communication capabilities. Each STA 140 can be fixed, mobile, or portable.

Figure 2:
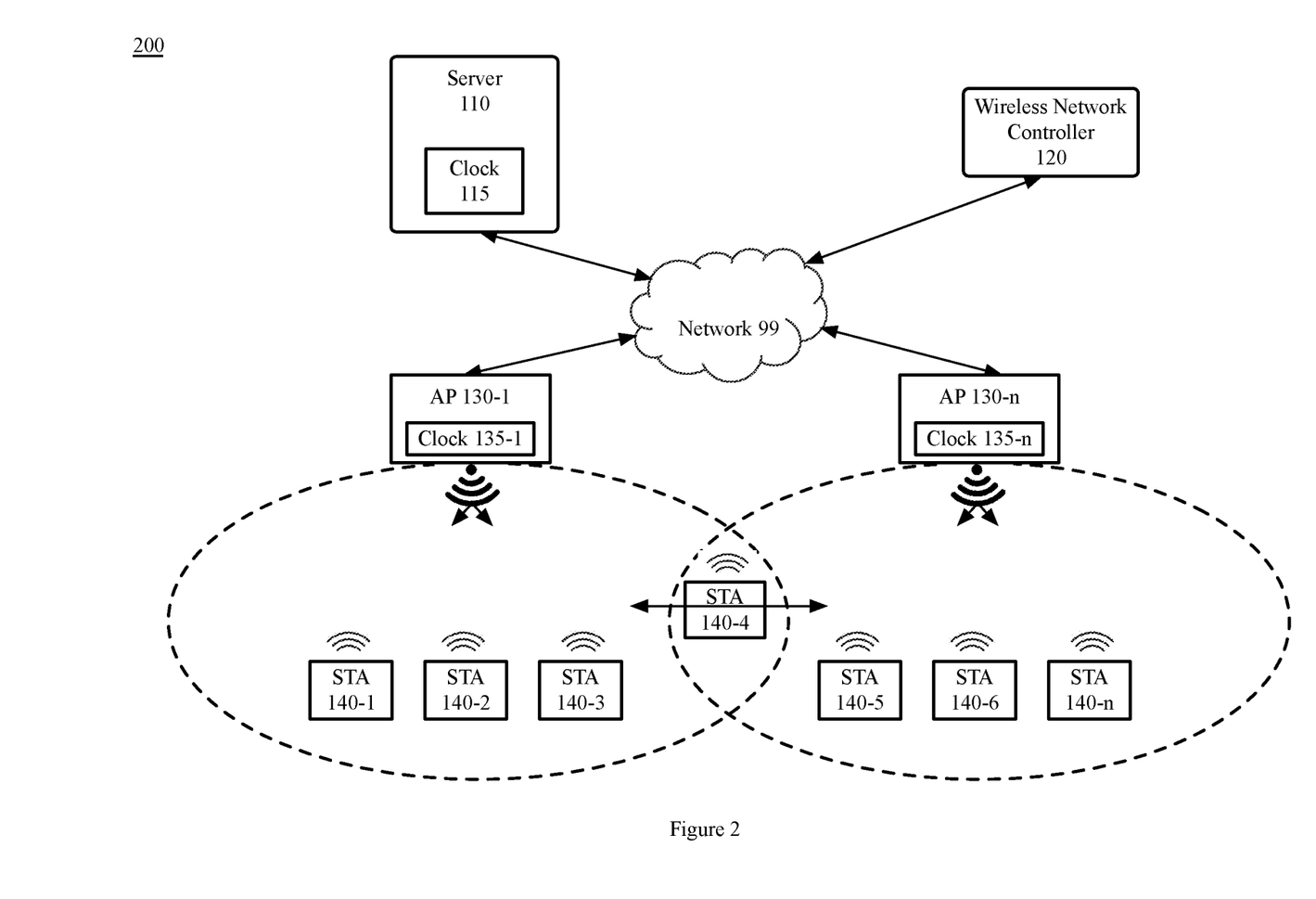
FIG. 2 is a block diagram depicting a wireless local area network system with mobile stations, in accordance with certain examples.

Each STA 140 may be programmed to comprise a location mapping of each of the APs 130 within wireless local area network system 100. The location mapping of each of the APs 130 allows each STA 140 to know the STA 140 position relative to each of the APs 130. In an example, each STA 140 will know, based on the location mapping, when a transition to a new AP 130 will be required. For example, and as depicted in FIG. 2, STA 140-4 may be in communication with AP 130-1 but in motion toward AP 130-2. STA 140-4 will recognize the need to transition to AP 130-2 based on the location mapping.

FIG. 2 is a block diagram depicting a wireless local area network system 200 with mobile stations, in accordance with certain examples. In an example embodiment, FIG. 2 depicts wireless local area network system 100 described in reference to FIG. 1 with a mobile station STA 140-4. STA 140-4 is depicted as moving from a first AP 130 to a second AP 130. In an example, STA 140-4 is in communication with AP 130-1 but is in motion towards and transitioning to communications with AP 130-2.

Wireless local area network system 100 may comprise other devices such as routers, switches, modems, repeaters, and antennae that are not depicted in FIG. 1 or FIG. 2.

Figure 9:
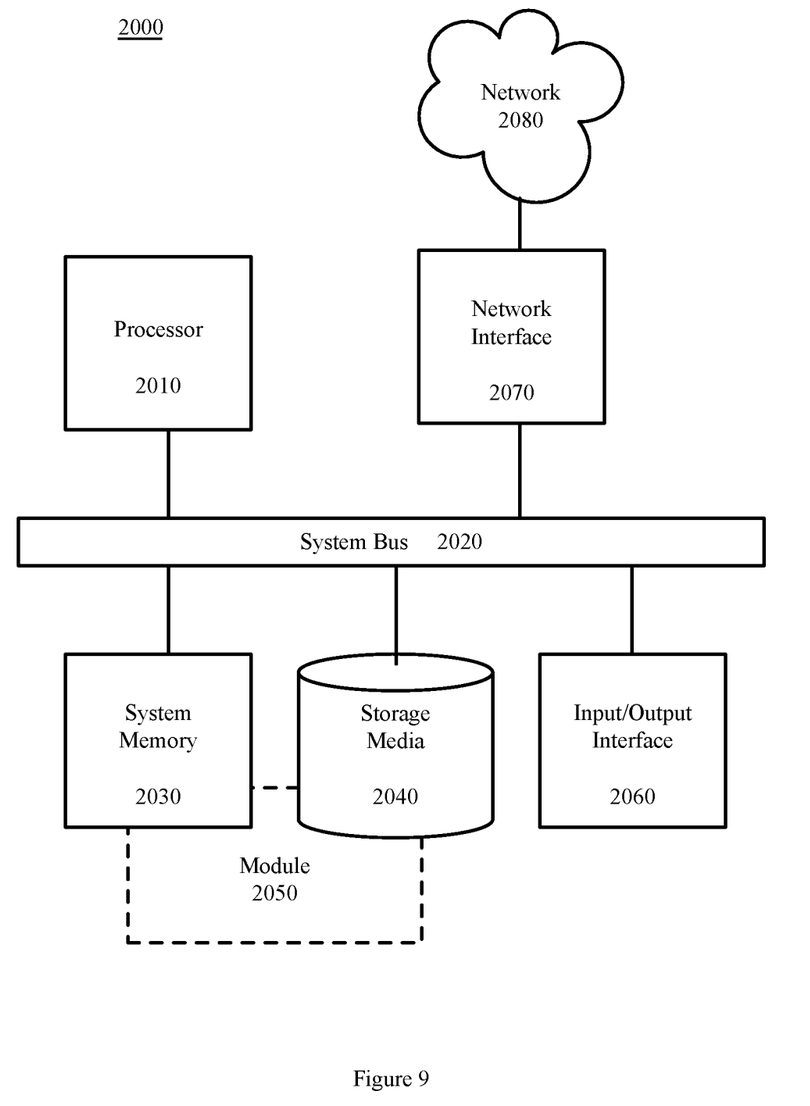
FIG. 9 is a block diagram depicting a computing machine and a module, in accordance with certain examples.

The network computing devices and any other computing machines associated with the technology presented herein may be any type of computing machine, such as, but not limited to, those discussed in more detail with respect to FIG. 9. For example, each device can include a server, a desktop computer, a laptop computer, a tablet computer, a television with one or more processors embedded therein and/or coupled thereto, a smart phone, a handheld computer, a PDA, a router, a switch, a hub, a gateway, a modem, an access point, a bridge, or any other wired or wireless processor-driven device. The computing machines discussed herein may communicate with one another, as well as with other computing machines or communication systems over one or more networks. Each network may include various types of data or communications networks, including any of the network technology discussed with respect to FIG. 9.

Furthermore, any modules associated with any of these computing machines, such as modules described herein or any other modules (scripts, web content, software, firmware, or hardware) associated with the technology presented herein, may be any of the modules discussed in more detail with respect to FIG. 9.

The network connections illustrated are examples and other means of establishing a communications link between the computers and devices can be used. Moreover, those having ordinary skill in the art having the benefit of the present disclosure will appreciate that the devices illustrated in FIG. 1 and FIG. 2 may have any of several other suitable computer system configurations.

Example Processes

The methods illustrated in FIGS. 3 through 8 are described hereinafter with respect to the components of wireless local area network systems 100 and 200. The methods of FIGS. 3 through 8 may also be performed with other systems and in other environments. The operations described with respect to FIGS. 3 through 8 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits: the operations described herein also can be implemented as executable logic that is encoded in one or more non-transitory tangible media for execution (e.g., programmable logic arrays or devices, field programmable gate arrays, programmable array logic, application specific integrated circuits, etc.).

The methods of FIGS. 3 through 6 describe time synchronization of APs 130 in a wireless local area network ("WLAN") with mobile stations. The methods of FIGS. 3 through 6 describe time synchronization between two specific APs 130 of wireless local area network system 100 as an example embodiment. The methods of FIGS. 3 through 6 can occur concurrently and simultaneously between any of the two or more APs 130 of the wireless local area network system 100.

The methods of FIGS. 3 through 6 describe an example embodiment with fine time measurement ("FTM") exchanges between a first AP 130 and a first STA 140. For the purpose of this example, a single AP 130 and a single STA 140 are described in the methods of FIGS. 3 through 6. However, one of ordinary skill in the art will appreciate that FTM exchanges may be occurring between multiple APs 130 and multiple STAs 140 connected to the APs 130 simultaneously.

Figure 3:
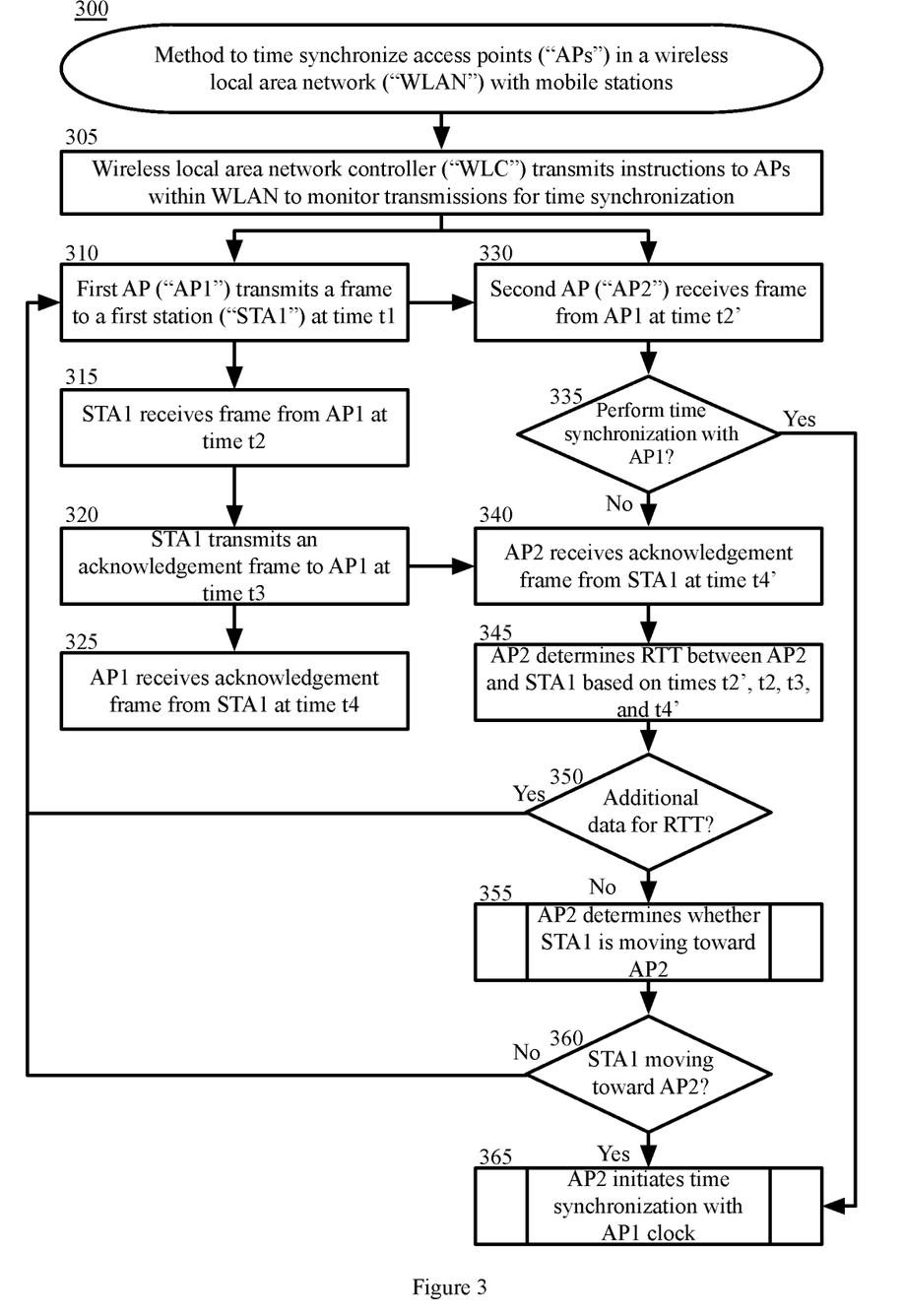
FIG. 3 is a block flow diagram depicting a method to time synchronize access points in a wireless local area network with mobile stations, in accordance with certain examples.

FIG. 3 is a block flow diagram depicting a method 300 to time synchronize access points 130 in a wireless local area network ("WLAN") with mobile stations 140, in accordance with certain examples. In block 305, WLC 120 transmits instructions to APs 130 within the WLAN to monitor transmissions for time synchronization. The instructions from WLC 120 direct each of the APs 130 to monitor transmissions from other APs 130 for FTM exchanges between APs 130 and STAs 140. In an example, APs 130 monitor transmissions from other APs 130 by changing transmission channels to match the transmission channels of the other APs 130. For example, AP 130-1 monitors transmissions from other APs 130 by changing channels to match the channel from AP 130-2, then AP 130-3, through AP 130-*n*. From block 305, method 300 proceeds in parallel paths to block 310 and block 330.

In block 310, a first AP 130 transmits a frame to a first STA 140 at a time $t_1$. In a continuing example, the first AP 130 is AP 130-1, and the first STA 140 is STA 140-1. The frame may also be referred to as a packet. The frame and the acknowledgement frame, described in block 320, are FTM transmissions in accordance with IEEE 802.1AS timing and synchronization standards. In an example, AP 130-1 timestamps the frame with the transmission time $t_1$.

In block 315, STA 140-1 receives the frame from AP 130-1 at a time $t_2$.

In block 320, STA 140-1 transmits an acknowledgement frame to AP 130-1 at a time $t_3$. In an example, STA 140-1 time stamps the acknowledgement frame with the transmission time $t_3$. In an example, the acknowledgement frame comprises the frame receipt time $t_2$. In an alternate example, the acknowledgement frame does not comprise the frame receipt time $t_2$.

In block 325, AP 130-1 receives the acknowledgement frame from STA 140-1 at a time $t_4$. From block 325, the method 300 returns to block 310 to repeat the FTM exchange between AP 130-1 and STA 140-1 in accordance with IEEE 802.1AS timing and synchronization standards.

Returning to block 305, the method 300 proceeds to block 330.

In block 330, a second AP 130 receives the frame from AP 130-1 at a time $t_2'$. In the continuing example, the second AP 130 is AP 130-2. The frame is received by AP 130-2 from AP 130-1 at a time $t_2'$, which occurs after the transmission time $t_1$.

In block 335, AP 130-2 determines whether to perform a time synchronization with AP 130-1. In one embodiment, AP 130-2 may be configured to time synchronize with AP 130-1 upon receiving the frame from AP 130-1. If AP 130-2 is configured to time synchronize with AP 130-1 upon receipt of the frame from AP 130-1, the method proceeds to block 365. In an alternate embodiment, AP 130-2 may be configured to determine whether STA 140-1 is moving toward AP 130-2 prior to time synchronization with AP 130-1. If AP 130-2 is configured to time synchronize with AP 130-1 based on a determination that STA 140-1 is moving toward AP 130-2, the method proceeds to block 340.

In block 340, AP 130-2 receives the acknowledgement frame from STA 140-1 at a time $t_4'$. The acknowledgement frame is received by AP 130-2 from STA 140-1 at a time $t_4'$, which occurs after the transmission time $t_3$.

In block 345, AP 130-2 determines the round trip transmission time ("RTT") between AP 130-2 and STA 140-1 based on times $t_2'$, $t_2$, $t_3$, and $t_4'$. In an example, the RTT can be calculated as: $RTT_n = (t'_4 - t'_2) - (t_3 - t_2)$. The difference $(t_3 - t_2)$ represents the processing delay in STA 140-1 based on factors such as bandwidth and short interframe spacing ("SIFS"). In an example, AP 130-2 retrieves time $t_2$ from the acknowledgement frame received from STA 140-1. In an alternate example, AP 130-2 calculates an estimated time $t_2$ using the transmission time $t_3$, the transmission bandwidth, and the SIFS for STA 140-1. In an example, the SIFS for STA 140-1 is dependent upon the particular IEEE 802.11 network and may be a fixed value of 3 µs, 10 µs, 16 µs, 28 µs, 160 µs, or any other suitable value. AP 130-2 stores the value for $RTT_n$ in a memory associated with AP 130-2.

In block 350, AP 130-2 determines if additional data for calculating a RTT is needed. To determine whether STA 140-1 is moving toward AP 130-2, a value of $RTT_n$ is compared to a subsequent $RTT_{n+1}$ value. For example, if only one value has been stored by AP 130-2 for the RTT, additional data will be needed to calculate a subsequent value of the RTT for the comparison. If an additional RTT value is needed, the method 300 follows the "yes" decision and returns to blocks 310/330 to capture additional data for the RTT calculation. If more than one value for the RTT has been stored by AP 130-2, the method 300 follows the "no" decision and proceeds to block 355.

In block 355, AP 130-2 determines whether STA 140-1 is moving toward AP 130-2. Block 355 is described in greater detail here with reference to method 355 of FIG. 4.

Figure 4:
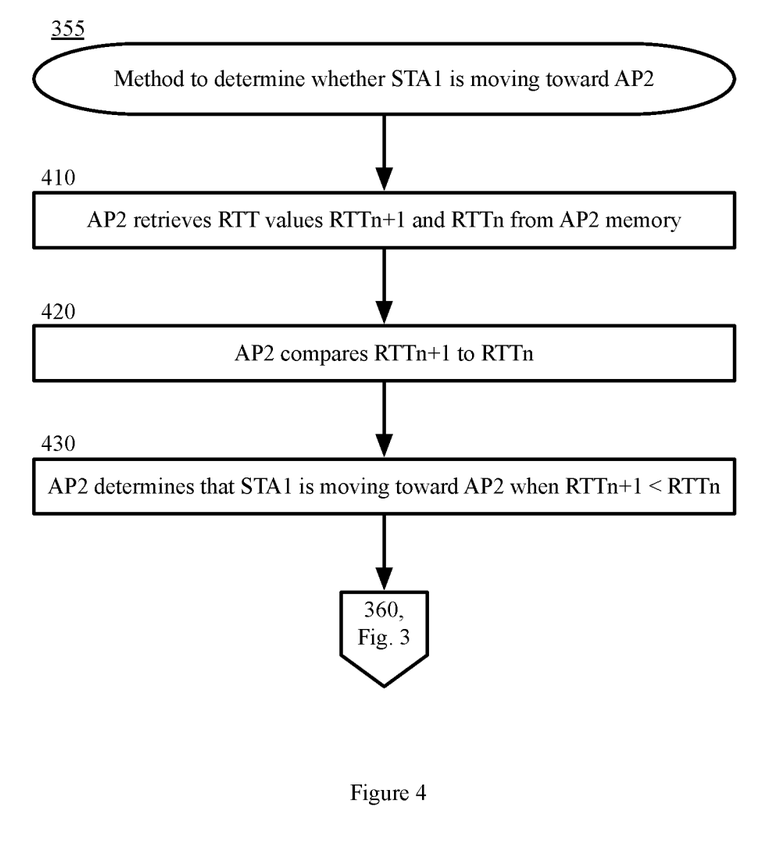
FIG. 4 is a block flow diagram depicting a method to determine whether a first station is moving towards a second access point, in accordance with certain examples.

FIG. 4 is a block flow diagram depicting a method 355 to determine whether a first station 140-1 is moving towards a second access point 130-2, in accordance with certain examples. In block 410, AP 130-2 retrieves RTT values $RTT_{n+1}$ and $RTT_n$ from the AP 130-2 memory.

In block 420, AP 130-2 compares $RTT_{n+1}$ to $RTT_n$. AP 130-2 determines if $RTT_{n+1}$ is greater than, less than, or equal to $RTT_n$. In an example, if $RTT_n$n is greater than $RTT_n$, STA 140-1 is determined to be moving away from AP 130-2.

If $RTT_n n$ is less than $RTT_n$, STA 140-1 is determined to be moving toward AP 130-2. If $RTT_{n+1}$ is equal to $RTT_n$, STA 140-1 is determined to be stationary with respect to AP 130-2. In an alternate example, the absolute value of the difference between $RTT_n n$ and $RTT_n$ is compared to a configured threshold. If $RTT_{n+1}$ is greater than $RTT_n$ and the absolute value of the difference between $RTT_{n+1}$ and $RTT_n$ is greater than the configured threshold, STA 140-1 is determined to be moving away from AP 130-2. If $RTT_{n+1}$ is less than $RTT_n$ and the absolute value of the difference between $RTT_n n$ and $RTT_n$ is greater than the configured threshold, STA 140-1 is determined to be moving toward AP 130-2. If $RTT_n n$ is equal to $RTT_n$ or the absolute value of the difference between $RTT_n n$ and $RTT_n$ is less than the configured threshold, STA 140-1 is determined to be stationary relative to AP 130-2 or additional data is required to determine that STA 140-1 is moving either away from or toward AP 130-2. In an example, the configured threshold may be 1 μsec, 5 μsec, 1 sec, 5 sec, or any suitable threshold value.

In block 430, AP 130-2 determines that STA 140-1 is moving toward AP 130-2 when $RTT_{n+1}$ is less than $RTT_n$, or, in the alternate embodiment, when $RTT_n h$ is less than $RTT_n$ and the absolute value of the difference between $RTT_{n+1}$ and $RTT_n$ is greater than the configured threshold, STA 140-1 is determined to be moving toward AP 130-2. A subsequently obtained lower value for a RTT indicates a shorter distance between AP 130-2 and STA 140-1 and represents an indication of motion toward AP 130-2. From block 430, the method 355 returns to block 360 of FIG. 3.

In block 360, if STA 140-1 is not moving toward AP 130-2, the method 300 returns to blocks 310/330 to continue to collect data for RTT calculations. If STA 140-1 is moving toward AP 130-2, the method 300 proceeds to block 365.

In block 365, AP 130-2 initiates a time synchronization with AP 130-1 clock. Block 365 is described in greater detail herein with reference to method 365 of FIG. 5.

Figure 5:
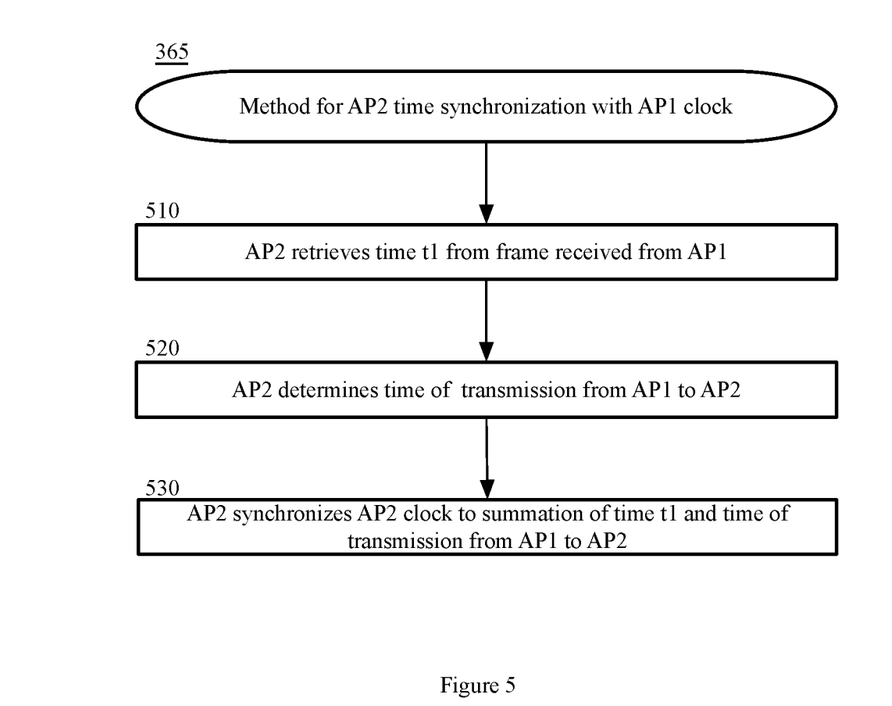
FIG. 5 is a block flow diagram depicting a method for a second access point to time synchronize with a first access point clock, in accordance with certain examples.

FIG. 5 is a block flow diagram depicting a method 365 for a second access point AP 130-2 to time synchronize with a first access point clock 135-1, in accordance with certain examples.

In block 510, AP 130-2 retrieves time $t_1$ from the frame received from AP 130-1. The receipt of the frame from AP 130-1 was previously described herein with reference to block 330 of FIG. 3.

In block 520, AP 130-2 determines the time of transmission ("ToT") from AP 130-1 to AP 130-2. As previously discussed in herein in reference to FIG. 1, APs 130 comprise a location mapping for each of the APs 130 within wireless local area network system 100. From the location mapping, AP 130-2 can determine the distance ("d") between AP 130-1 and AP 130-2. In an example, the ToT can be calculated as follows: ToT=d/c, where c is the speed of light. Any other suitable method to determine the ToT may be used.

In block 530, AP 130-2 synchronizes an AP 130-2 clock to the summation of the time $t_1$ and the ToT from AP 130-1 to AP 130-2. In an example, AP 130-2 synchronizes clock 135-2 to match the summation of the time $t_1$ and the ToT. In an alternate example, AP 130-2 synchronizes a virtual clock associated with STA 140-1 to match the summation of the time $t_1$ and the ToT. AP 130-2 is time synchronized with AP 130-1.

Figure 6:
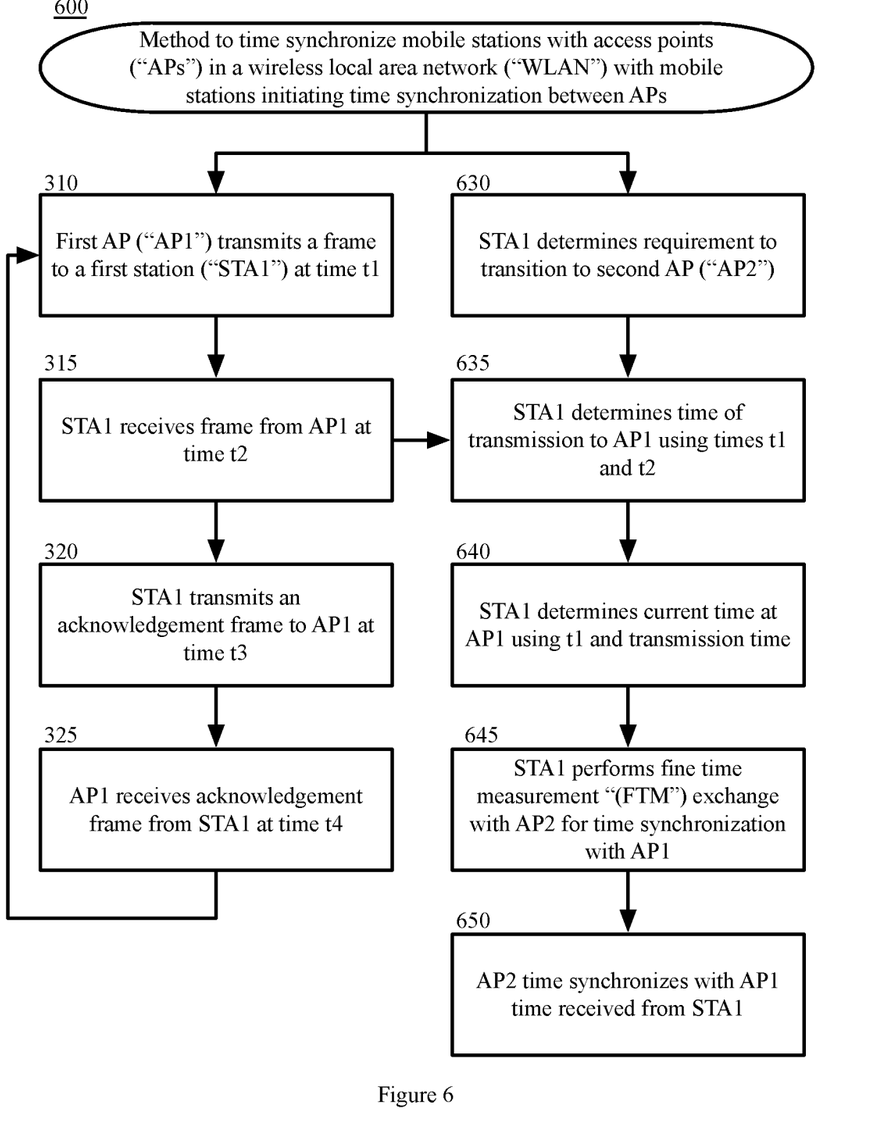
FIG. 6 is a block flow diagram depicting a method to time synchronize mobile stations with access points in a wireless local area network with mobile stations initiating the time synchronization between access points, in accordance with certain examples.

FIG. 6 is a block flow diagram depicting a method 600 to time synchronize mobile stations with access points in a wireless local area network with mobile stations initiating the time synchronization between access points, in accordance with certain examples. FIG. 6 is an alternate embodiment to time synchronize APs in wireless local area network system 100 that uses mobile stations to initiate time synchronization. Method 600 proceeds in parallel paths to block 310 and block 630.

Block 310 through block 325 were previously described herein with reference to FIG. 3. Occurring in parallel to block 310, the method 600 proceeds to block 630.

In block 630, a first STA 140 determines a requirement to transition to a second AP 130. In the continuing example, the first STA 140 is STA 140-1 and the second AP 130 is AP 130-2. In an example, STA 140-1 is in communication with AP 130-1 but is in motion towards AP 130-2. As previously described herein with reference to FIG. 1, STA 140-1 comprises a location mapping of the APs 130. Based on the location mapping and the location of STA 140-1, STA 140-1 recognizes that STA 140-1 is moving toward AP 130-2 and subsequently will be within AP 130-2 area of coverage. STA 140-1 determines that a transition to AP 130-2 will be required to maintain wireless communications within wireless local area network system 100.

In block 635, STA 140-1 determines the ToT to AP 130-1 using times $t_1$ and $t_2$. The ToT to STA 140-1 from AP 130-1 is the difference between times $t_2$ and $t_1$.

In block 640, STA 140-1 determines a current time at AP 130-1 using time $t_1$ and the ToT. The current time at AP 130-1 is the summation of time $t_1$ and the ToT determined in block 635.

In block 645, STA 140-1 performs a FTM exchange with AP 130-2 for time synchronization with AP 130-1. The FTM exchange is in accordance with IEEE 802.1AS timing and synchronization standards. STA 140-1 transmits a frame to AP 130-2 comprising a time value for time synchronization to AP 130-1. The time value is the current time at AP 130-1 determined in block 640 with the addition of the processing delay within STA 140-1. In an example, the processing delay within STA 140-1 is the SIFS. In an example, the SIFS for STA 140-1 is dependent upon the particular IEEE 802.11 network and may be a fixed value of 3 μs, 10 μs, 16 μs, 28 μs, 160 μs, or any other suitable value.

In block 650, AP 130-2 time synchronizes with AP 130-1 time received from STA 140-1. In an example, AP 130-2 synchronizes clock 135-2 to match the time value received in block 645. In an alternate example, AP 130-2 synchronizes a virtual clock associated with STA 140-1 to match the time value received in block 645. AP 130-2 is time synchronized with AP 130-1.

Figure 7:
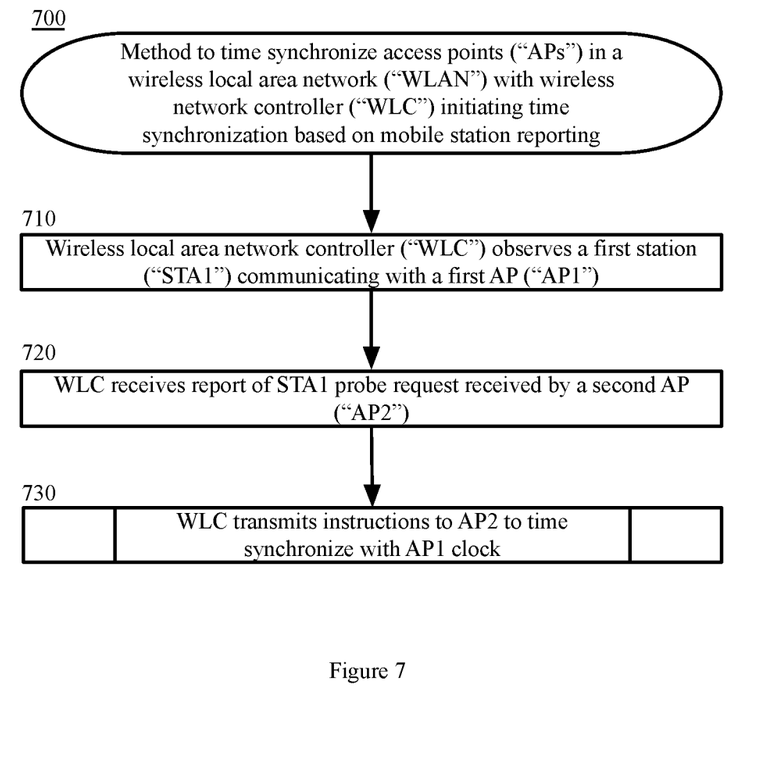
FIG. 7 is a block flow diagram depicting a method to time synchronize access points in a wireless local area network with a wireless network controller initiating time synchronization based on mobile station reporting, in accordance with certain examples.

FIG. 7 is a block flow diagram depicting a method 700 to time synchronize APs 130 in a wireless local area network 100 with a wireless network controller ("WLC") 120 initiating time synchronization based on mobile station reporting, in accordance with certain examples. FIG. 7 is an alternate embodiment to time synchronize APs in wireless local area network system 100 with time synchronization initiated by WLC 120.

In block 710, WLC 120 observes a first STA 140 communicating with a first AP 130. In the continuing example, the first STA 140 is STA 140-1, and the first AP 130 is AP 130-1.

In block 720, WLC 120 receives a report of a STA 140-1 probe request that is received by a second AP 130-2. In an example, the probe request is a control frame sent by STA 140-1 for nearby APs 130 to send information about wireless networks that are available for connection. In response to the probe request, STA 140-1 receives a probe response from AP 130-2 with 802.11 capabilities of AP 130-2.

In block 730, WLC 120 transmits instructions to AP 130-2 to time synchronize with AP 130-1 clock. Block 730 is described in greater detail herein with reference to the method 730 of FIG. 8.

Figure 8:
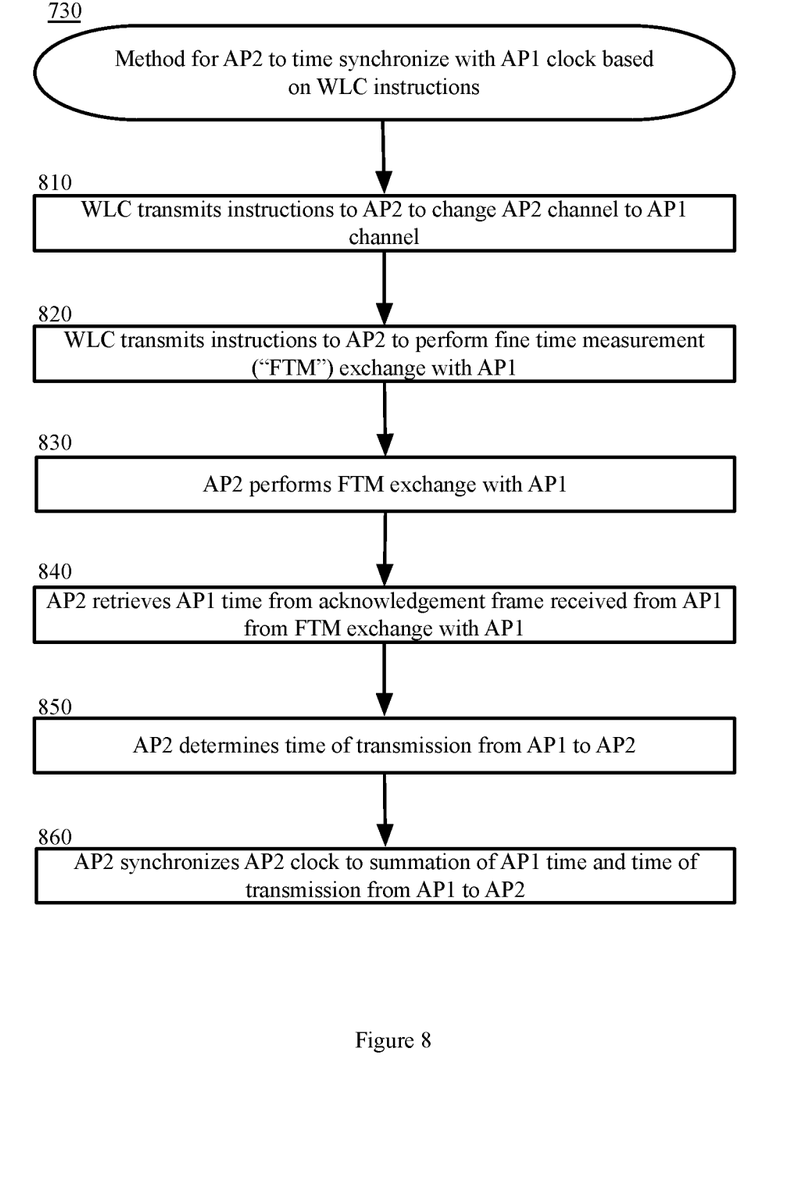
FIG. 8 is a block flow diagram depicting a method for a second access point to time synchronize with a first access point clock based on wireless network controller instructions, in accordance with certain examples.

FIG. 8 is a block flow diagram depicting a method 730 for AP 130-2 to time synchronize with AP 130-1 clock based on wireless network controller instructions, in accordance with certain examples.

In block 810, WLC 120 transmits instructions to AP 130-2 to change the AP 130-2 channel to the AP 130-1 channel.

In block 820, WLC 120 transmits instructions to AP 130-2 to perform a FTM exchange with AP 130-1. The FTM exchange is in accordance with IEEE 802.1AS timing and synchronization standards.

In block 830, AP 130-2 performs the FTM exchange with AP 130-1.

In block 840, AP 130-2 retrieves API time from an acknowledgement frame received from AP 130-1 from the FTM exchange with AP 130-1. In the acknowledgement frame, AP 130-1 timestamps the time of transmission in the acknowledgement frame transmitted to AP 130-2.

In block 850, AP 130-2 determines the ToT from AP 130-1 to AP 130-2. Block 850 was previously described herein with reference to block 520 of FIG. 5.

In block 860, AP 130-2 synchronizes AP 130-2 clock to the summation of AP 130-1 time and the ToT from AP 130-1 to AP 130-2. AP 130-1 time was received as described in block 840 and the ToT was determined in block 850. In an example, AP 130-2 synchronizes clock 135-2 to match the summation of AP 130-1 time and the ToT. In an alternate example, AP 130-2 synchronizes a virtual clock associated with STA 140-1 to match the summation of AP 130-1 time and the ToT. AP 130-2 is time synchronized with AP 130-1.

Other Examples

FIG. 9 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. The processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include WANs, LANS, intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. Any of the processor 2010, the other elements of the computing machine 2000, or the various peripherals discussed herein may be integrated into a single device such as a system on chip ("SOC"), system on package ("SOP"), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. Computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

The systems, methods, and acts described in the examples presented previously are illustrative, and, alternatively, certain acts can be performed in a different order, in parallel with one another, omitted entirely, and/or combined between different examples, and/or certain additional acts can be performed, without departing from the scope and spirit of various examples. Accordingly, such alternative examples are included in the scope of the following claims, which are to be accorded the broadest interpretation so as to encompass such alternate examples.

Although specific examples have been described above in detail, the description is merely for purposes of illustration. It should be appreciated, therefore, that many aspects described above are not intended as essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

What is claimed is:

1. A method performed by a computing device, comprising:
    performing, by the computing device, a first time synchronization with a first access point (AP) with which the computing device is connected;
    synchronizing a local clock of the computing device with a first clock of the first AP based at least in part on the first time synchronization such that the local clock of the computing device corresponds to the first clock of the first AP;
    determining that the computing device is to transition from being connected to the first AP to being connected to a second AP, the determining comprising:
        determining a first round trip transmission time between the first AP and the computing device;
        determining a second round trip transmission time between the second AP and the computing device; and
        determining that the second round trip transmission time is less than the first round trip transmission time;
    based at least in part on transitioning from the first AP to the second AP, performing a second time synchronization with the second AP; and
    synchronizing the local clock with a second clock of the second AP such that the first clock of the first AP is time synchronized with the second clock of the second AP.

2. The method of claim 1, wherein synchronizing the local clock with the second clock comprises:
    determining a first time at which a time measurement exchange was transmitted by the computing device;
    determining a second time at which particular time measurement exchange was received at the second AP; and
    adjusting a time value of the local clock based at least in part on the first time and the second time.

3. The method of claim 2, wherein the second time is calculated based upon a location mapping of the computing device in a wireless network established at least in part by the second AP.

4. The method of claim 2, wherein the time measurement exchange is a fine time measurement ("FTM") exchange in accordance with IEEE 802.1AS timing and synchronization standard.

5. The method of claim 1, wherein the computing device is a mobile station.

6. The method of claim 1, wherein:
    the first AP establishes a first wireless network to which first computing devices are connected;
    the first AP performs time synchronizations with the first computing devices such that the first computing devices are synced with the first AP;
    the second AP establishes a second wireless network to which second computing devices are connected; and
    the second AP performs time synchronizations with the second computing devices such that the second computing devices are synced with the second AP.

7. A computing device comprising:
    one or more processors; and
    one or more non-transitory computer-readable media storing computer-executable instructions that, when executed by the one or more processors, causes the one or more processors to perform operations comprising:
        performing, by the computing device, a first time synchronization with a first access point (AP) with which the computing device is connected;
        synchronizing a local clock of the computing device with a first clock of the first AP based at least in part on the first time synchronization such that the local clock of the computing device corresponds to the first clock of the first AP;
        determining that the computing device is to synchronize with a second AP;
        performing a second time synchronization between the computing device and the second AP; and
        synchronizing the local clock with a second clock of the second AP such that the first clock of the first AP is time synchronized with the second clock of the second AP,
        wherein synchronizing the local clock with the second clock comprises:
            determining a first time at which a time measurement exchange was transmitted by the computing device;
            determining a second time at which particular time measurement exchange was received at the second AP; and
            adjusting a time value of the local clock based at least in part on the first time and the second time.

8. The computing device of claim 7, wherein determining that the computing device is to synchronize with the second AP comprises:
    determining a first round trip transmission time between the first AP and the computing device;
    determining a second round trip transmission time between the second AP and the computing device; and
    determining that the second round trip transmission time is less than the first round trip transmission time.

9. The computing device of claim 7, wherein the second time is calculated based upon a location mapping of the computing device in a wireless network established at least in part by the second AP.

10. The computing device of claim 7, wherein the time measurement exchange is a fine time measurement ("FTM") exchange in accordance with IEEE 802.1AS timing and synchronization standard.

11. The computing device of claim 7, wherein the computing device is a mobile station.

12. The computing device of claim 7, wherein:
    the first AP establishes a first wireless network to which first computing devices are connected;
    the first AP performs time synchronizations with the first computing devices such that the first computing devices are synced with the first AP;
    the second AP establishes a second wireless network to which second computing devices are connected; and
    the second AP performs time synchronizations with the second computing devices such that the second computing devices are synced with the second AP.

13. One or more non-transitory computer-readable media storing computer executable instructions that, when executed by one or more processors, cause the one or more processors to perform operations comprising:
    performing, by a computing device a first time synchronization with a first access point (AP) with which the computing device is connected, wherein:
        the first AP establishes a first wireless network to which first computing devices are connected; and
        the first AP performs time synchronizations with the first computing devices such that the first computing devices are synced with the first AP;
    synchronizing a local clock of the computing device with a first clock of the first AP based at least in part on the first time synchronization such that the local clock of the computing device corresponds to the first clock of the first AP;

determining that the computing device is to synchronize with a second AP;

performing a second time synchronization between the computing device and the second AP; and synchronizing the local clock with a second clock of the second AP such that the first clock of the first AP is time synchronized with the second clock of the second AP, wherein:

the second AP establishes a second wireless network to which second computing devices are connected; and the second AP performs time synchronizations with the second computing devices such that the second computing devices are synced with the second AP.

14. The one or more non-transitory computer-readable media of claim 13, wherein determining that the computing device is to synchronize with the second AP comprises:

determining a first round trip transmission time between the first AP and the computing device;

determining a second round trip transmission time between the second AP and the computing device; and determining that the second round trip transmission time is less than the first round trip transmission time.

15. The one or more non-transitory computer-readable media of claim 13, wherein synchronizing the local clock with the second clock comprises:

determining a first time at which a time measurement exchange was transmitted by the computing device;

determining a second time at which particular time measurement exchange was received at the second AP; and adjusting a time value of the local clock based at least in part on the first time and the second time.

16. The one or more non-transitory computer-readable media of claim 15, wherein the second time is calculated based upon a location mapping of the computing device in a wireless network established at least in part by the second AP.

17. The one or more non-transitory computer-readable media of claim 15, wherein the time measurement exchange is a fine time measurement ("FTM") exchange in accordance with IEEE 802.1AS timing and synchronization standard.

* * * * *